May 15, 1962   B. BERGHAUS ET AL   3,035,205
METHOD AND APPARATUS FOR CONTROLLING GAS DISCHARGES
Filed Jan. 18, 1951
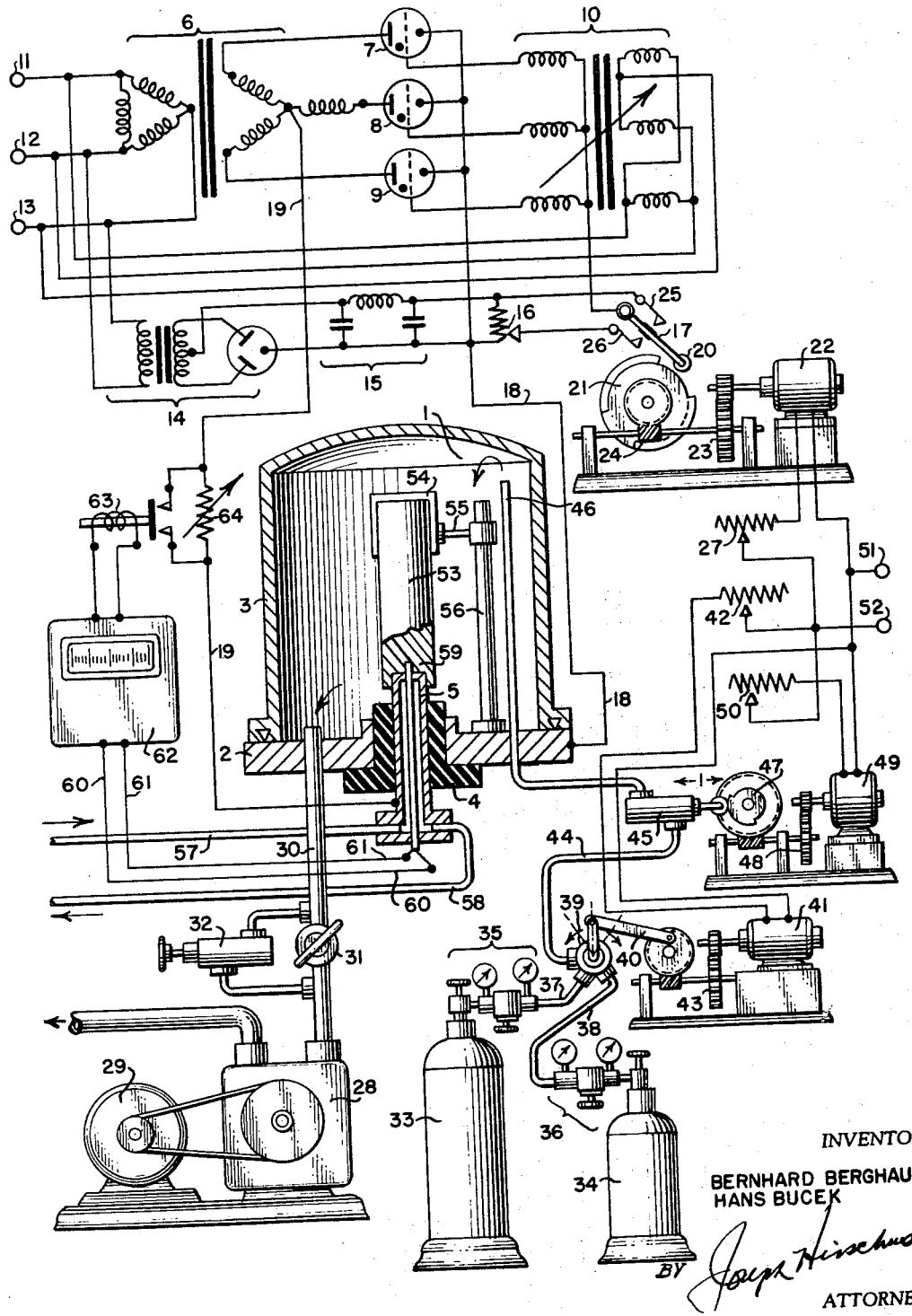
INVENTORS
BERNHARD BERGHAUS &
HANS BUCEK
BY Joseph Hirschman
ATTORNEY

United States Patent Office

3,035,205
Patented May 15, 1962

3,035,205
METHOD AND APPARATUS FOR CONTROLLING GAS DISCHARGES
Bernhard Berghaus, Lachen, and Hans Bucek, Zurich, Switzerland, assignors, by direct and mesne assignments, to Elektrophysikalische Anstalt Bernhard Berghaus, Vaduz, Liechtenstein
Filed Jan. 18, 1951, Ser. No. 206,674
Claims priority, application Switzerland Aug. 3, 1950
18 Claims. (Cl. 315—111)

It is well known from present day scientific knowledge that glow discharges occur at pressures from a hundredth of a millimetre mercury column (0.01 mm. Hg). At low pressures between 0.1 and 5 mm. Hg the passage of electricity through the gas takes place as a glow discharge in the usual manner. In the pressure region from 5 to 20 mm. Hg, these glow discharges may, under certain circumstances, be still maintained but they are already unstable and may finally pass over into the normal spark or arc discharge when the pressure is further increased, depending on the power of the supplying source of current (see Loeb, Fundamental Processes of Electrical Discharge in Gases, New York, John Wiley and Sons, inc., 1947).

Disregarding the use of gaseous discharges for illuminating purposes, the technical application of same is found in the field of metal sputtering, heating in low-pressure glow discharges, carrying out chemical reactions in dark corona discharges under atmospheric pressure, for example for the production of ozone, or in the form of scintillating discharges of a few tenths of an atmosphere as used for example in the synthesis of hydrocarbons. Further, the electric arc is used, in an atmosphere consisting of air, for the production of nitrogen, or in different atmospheres, for producing other substances, for example, for manufacturing acetylene in a hydrogen atmosphere. In these cases, either pure temperature effects are created or the substances are influenced chemically or electrically.

According to further literature, glow discharges of high intensity at gas pressures up to 40 mm. Hg have already been applied for the surface improving of materials, particularly metals or for other treatment. It may be assumed that a really certain control of such processes, such as is necessary for any technical application, is only possible at pressures up to not more than 10 mm. Hg whilst the region between 10 and 40 mm. Hg has been ruled out as being of no practical application. The production of stable flow discharge at these pressures is indeed very difficult, especially as intense local heating and chemical attacks occur, due to ion bombardment and as the consequence of electron streams. The glowing tract produced by the discharges severely narrows itself down with increasing pressure, so that large quantities of energy are released over a small space, with the result that the above-mentioned local heating effects and chemical actions arise. The consequence is that the lead-in devices, and particularly their insulation, are extensively destroyed by these discharges in a relatively short time. These facts must be taken into account particularly in the case of high-intensity discharges such as are met with in the technical field, for example for treating materials, chemical synthesis and disintegration processes. It must also be taken into account that these conversion processes release considerable quantities of metallic vapor and sputtered particles which lead to depositions on the electrodes and even to bridge formations, so that flash-overs with their destructive accompanying effects occur.

According to the conception already put forth and confirmed by the most up-to-date literature (Loeb and others), there is however no possibility of exploiting economically the low pressures under consideration. Generally the notion has been held, that apart from the above-mentioned pressures of 40 mm. Hg, quoted in the cited literature, technically applicable glow discharges are only attainable at pressures of 5 mm. Hg and still lower, if there is not to be the risk of the glow discharge passing over into other discharge forms, particularly sleeve discharges and scintillating discharges. These forms have the fundamental defect, which precludes their practical utility, namely that their expanse is superficially very limited and in fact is generally confined to a spot. This incurs intense local heating and over-heating and to an energy distribution restricted exclusively to the discharge path between anode and cathode. Hence it is not possible for work-pieces to be treated over their entire surface once they have been given their shape. Moreover, the desired transfer of a maximum proportion of the available electrical energy to the work-piece under treatment does not take place.

In contrast to the above, glow discharges within the meaning of the present invention imply gaseous discharges which manifest the typical external form of the discharge even at pressures above the region from 5 to 40 mm. Hg possible up to atmospheric pressure and beyond. Thus the energies supplied may amount to many times the values usual in the well known applications, say for lighting purposes, i.e. several or even many kilowatts.

The conducting of technical processes by means of gaseous discharges, and by technical processes are meant measures based on physical actions such as diffusion, e.g. chromium in steel surfaces, decarbonising, etc., those based on chemical actions such as reactions (synthesis) and those based on physico-chemical ones (e.g. the nitriding of steel, carbonising, etc.) requires the controlling of these actions independently of the form of the object being worked. The treatment accordingly takes place at temperatures determined by the result to be obtained, the attainment of these temperatures being brought about by the action of the gaseous discharge itself. The specific loading current (in amperes per sq. cm.) supplied to the surface of the treated object by the gas discharge is so chosen that the desired temperature is attained and then also maintained. As such energy-releasing discharge forms are technically difficult to control, the processes are mainly carried out only in discharge vessels in which, in a manner known per se, the lead-in devices of the current lead through the vessel are protected from the attack of the gaseous discharge on the insulators by means of screening gaps placed in front. The technical treatment of work objects now leads to the necessity of controlling the gaseous discharge in such a way that the ionising action used chiefly for carrying out the process can be adjusted as to kind and magnitude regardless of all other influences such as shape of work-piece, prevailing temperatures etc. For example, a reducing action in a hydrogen atmosphere or a nitriding action in an ammonia atmosphere requires, for a particular material, a definite surface loading and a gas pressure adjusted to same, so as to adapt the intensity of the ion bombardment to the reaction depth required, the nature of same and the time for carrying out the reaction. For the sake of good efficiency and a high degree of economy upon the basis of the energy and gas consumption, and likewise for obtaining as high an output as possible based on the necessary treatment time and increase in the number of work-pieces to be treated in the same chamber, it would be very desirable to employ as high gas pressures as possible. High gas pressures result in a correspondingly high specific electrical surface loading and usually as a consequence, excessively high temperature which are by no means immediately suitable for the process in question.

In the main, gas pressures in the region of 0.1 mm. up to 50 mm. mercury column and beyond are employed, which pressures result in great energy concentration at the electrodes. However pressures below 0.1 mm. down to 0.01 mm. also come into consideration and on the other hand the use of higher gas concentrations of 50 mm. Hg, preferably even up to atmospheric pressure, is not to be excluded. In the case of work objects having cavities, say in the form of drilled holes, there is no longer at all temperatures an equilibrium between surface parts which share in the heat radiation, that is generally between the outer surface of the objects and those parts which only participate in the temperature increase (i.e. in a special case at the inner walls, under the assumption that the whole surface is to be covered by a glow discharge). This means that at a particular ratio between outer and inner surface, there is a certain lower temperature limit below which it is impossible to go, if the glow covers the entire surface of the object. On the other hand there are also difficulties in positively attaining a discharge at all internal portions of a work-piece provided with cavities, unless a so-called hollow cathode operation takes place, i.e., by making the surface loading correspondingly high. This requirement further impairs the thermal balance between warming up surface portions and radiating ones thus resulting in substantially higher temperatures than the optimum or even practically suitable ones for the purpose in question. Generally for the treatment of metals, for instance, the temperature limits are fairly narrowly fixed; for example, in the treatment of steel it is necessary to avoid reaching the conversion temperatures. Therefore hitherto in applying gaseous discharges for carrying out technical processes, one was limited to certain reactions and work-piece or object forms.

The method proposed according to the invention, for controlling gaseous discharges—preferably glow discharges—used for conducting technical processes, is characterised by the fact that according to the invention the course of the gaseous discharge is made discontinuous.

This discontinuous shaping of the gaseous discharge may be approached from three sides. There is first of all the possibility of giving the gaseous discharge a discontinuous progress by influencing at least one of the determining electrical magnitudes. On the other hand the course of the gaseous discharge may be made discontinuous by influencing at least one of the substances present in the treatment space and there is finally the possibility of proceeding from the work-piece or object itself. Of course, these measures may be adopted singly or in combination with each other. As a discontinuous form, one may consider a time modulation of the gaseous discharge, by applying generally periodic or rhythmic modulations. Aperiodic or unrhythmical influences are however by no means excluded. In this way the operating regions of the various determining magnitudes, which are recognised as of advantage or whose effects are desired, will continue and be made effective in the modulation cycle. Hence in the final product there will be a summation of the factors which otherwise only arise individually.

Considering first of all the influencing of the determining electrical magnitudes, the pulse control of the gaseous discharge appears particularly suitable. By this application it is possible to adapt the intensity of the ionisation, for example in glow discharges, to all requirements of the desired technical reactions and treatments without however being limited by any other influencing magnitudes associated therewith. Above all, the desired temperature may be set completely independent of the shape of the object or work-piece or the remaining parameters of the gaseous discharge such as voltage, current, nature and pressure of the gaseous atmosphere etc. The action of the gaseous discharge therefore no longer takes place continuously as was formerly the case, but in pulses whose periods are so adjusted with respect to the pauses, that the mean value of the applied energy results in the desired temperature values through lengthy over-all periods, taking into consideration the intensity of the pulse. The absolute value of the pulse time is so chosen that at least the time duration of the ionising or de-ionising actions is covered with certainty, assuming the kind of gas, the gas pressure, the electrode material and temperature are given. The upper limit of the pulse and interval periods is however fixed by the heat capacity or rather heat inertia of the work-piece, that is, temperature fluctuations going beyond certain minimum tolerances must be avoided. It is also possible, for example in order to maintain the effect of the activated atmosphere upon the work-piece even during the pauses, to carry out the pulse control between a maximum value and a minimum value above zero. That is, the pulse is not controlled back to zero and consequently the glow which is to be maintained, is not extinguished. Generally the duration of the interval is made at least equal to the value of the pulse duration, but conditions may also arise making it advisable to make the interval duration at least twice the pulse duration. When powerful pulses are used even substantially greater ratios between the time durations of the pause and pulse will be chosen. In addition to the above possibility of selectively influencing the various determining magnitudes of the glow discharge there are also a number of other advantages. For example, the diffusion or reaction processes are to some extent considerably accelerated, the impulsive energy supply being effective by increasing the degree of ionisation of the gas at the material's surface which is a deciding factor in initiating the diffusion actions. The balancing of these influences against each other is also possible through the time duration of the energy pulse and amplitude, because the thermic actions, which are subject to considerable inertia as regards the flow of heat in the interior of the work-piece are predetermined chiefly by the time duration, whereas the ionisation state is influenced by the voltage, etc. The pulses moreover give rise to lead, often intense, heating actions in the treatment atmosphere, resulting in corresponding pressure fluctuations and consequently a very desirable convection of the gas at the work-piece.

Devices for carrying out the process are characterised, according to a further embodiment of the invention by arrangements which cause the course of the gaseous discharges, employed for carrying out technical processes, to assume a discontinuous form.

Accordingly it would be possible to employ for the first method of influencing the determining electrical magnitudes all measures in the technical art which are known as pulse controls. The pulse control of the gaseous discharge may be derived from a generator of any type. Thus the electric power delivered from a rotating electric machine, from mercury vapor rectifiers, dry rectifiers or contact rectifiers may be chopped by a periodically operated switch, say rotating contact discs, cam discs operating switches, and so on. In this manner pulse durations of the order of magnitude from $10^{-1}$ to 10 seconds or longer may readily be obtained. The time modulation may also be attained by purely electrical means acting like switches, by employing thyratrons, ignitrons or similar controllable discharge tubes. The control action itself may also in this case be initiated by switching devices, or the entire control action may be carried out by using electronic means such as pulse generators having vacuum or gaseous discharge tubes. By using such means the pulse durations and/or the interval durations may be set to the order of magnitude of $10^{-1}$ seconds or less, but, for the reasons mentioned above, durations under one thousand micro-seconds do not come into consideration save in exceptional cases. Finally the pulse control may be arranged in the supplying current source itself by employing for example grid-controlled rectifiers. The shape of the pulse will preferably be made rectangular or approximately so, to ensure constant conditions of the gaseous discharge during the active period.

Voltage peaks such as arise with triangular pulses sometimes produce desirable and sometimes undesirable secondary effects so that in view of these circumstances it is best to rely on the rectangular pulse form as a fundamental principle.

The modulating of the determining electrical magnitudes has the particular advantage of simple regulation. Even the variation of the pulse and interval durations provides a possibility of regulating in this way. Naturally, it is not imperative to rely on the variation of the time duration alone; the amplitude of the pulses or both may be varied. Of course the regulation may be carried out automatically, for example by utilising the temperature to influence the pulses in order to ensure a definite standard temperature condition automatically.

What has been said with regard to the determining electrical magnitudes applies appropriately to the substances present in the treatment space, generally in the form of gaseous atmospheres. Accordingly, the kind of gas and or the gas pressure may be caried so as to make the progress of the gas discharge discontinuous. Generally it will be sufficient to allow the gas pressure to pulsate. Moreover it is not essential to substitute the treating gas such as hydrogen, ammonia, metallic vapors, etc., as a whole by other gases, vapors, sublimations or mixtures thereof. It is sufficient if other substances are introduced into such atmospheres, for example by rhythmically adding a rare gas such as argon.

The variation of the gas pressure is carried out through technical means known per se. For example a needle valve regulating the flow of gas may be periodically opened or closed, so that the gas pressure oscillates about a suitably chosen mean value. The pressure amplitude is here determined by the degree of opening or closing and the time period of the pressure modulation is given by the rate of pressure equalisation in the treatment vessel. Generally it comes to an order of magnitude of minutes.

Finally the course of the gaseous discharge may be made discontinuous by varying the condition of the work-piece. Of course here it is not so much a question of the possible periodic or rhythmic variation. Generally the discontinuity of the gaseous discharge, attained once only, must be taken with respect to the condition of the work-piece in which the latter is not changed. Such variations from the original basic condition may be brought about by partially screening the work-piece, again possibly periodically or rhythmically. Thus, the glow at the cathode may be displaced by screens which carry anode potential and which surround the screening parts with a narrow gap spacing. There is also the further possibility of partially screening the work-pieces with heat-proof insulating bodies at which no glow discharge takes place. When the shapes of the objects or work-pieces are of geometrically simple form, these screens in their simplest construction consist of ceramic sleeves. When the object shapes are more complicated, it is convenient to employ internally hollow metallic shapes which encase the surface contour but which have externally simple forms and are in turn arranged inside ceramic screening bodies. Ceramic materials are sufficiently firm and solid at the temperatures arising and have an insulating quality which prevents a glow from forming. Lastly the surface portions of the work piece which are to be screened may also be covered with applied masses forming an insulating heat-proof coating. Pulverulent or colloidal ceramic substances with suitable binding agents are suitable for this purpose. The object may also be subjected to variations by providing it with cooled portions or cooling jackets. Here again the heat balance is so adjusted independently of the determining magnitudes of the gaseous discharge, that the method may be carried out with success and with a high degree of efficiency. The cooling means may be delivered periodically or the supply cut off.

The drawing illustrates an embodiment of the invention taking as an example the treatment of a work-piece with alternating treating gases, variable pressure and above all with current pulses. These measures may be adopted singly, combined in groups or altogether.

Considering the drawing in detail, 1 is the interior of the gaseous discharge chamber which consists of the base 2 and the cover 3. In the usual manner, the base portion 2 is traversed by the lead-in device, which is illustrated only schematically and is composed of the insulator portion 4 and the electrode portion 5 traversed by coolant.

The source of current indicated is a three-phase rectifier which comprises the supply transformer 6, three rectifier tubes 7, 8, 9 and in the usual manner the inductive phase-shifter 10 for the grid control of the tubes 7, 8, 9. The rectifier is fed at the terminals 11, 12, 13 which are also in communication with the auxiliary rectifier 14 and the connections of the phase shifter 10. After being filtered by the usual chokes and condensers, the direct voltage supplied by the auxiliary rectifier 14 is used for the additional supply to the rectifier tubes 7, 8 and 9 via a potentiometer 16 and a switching contact 17. The positive pole of the rectifier is connected through the lead 18 to the bounding wall 2, 3 serving as an anode. The cathode 5 arranged in the base 2 is joined to the negative pole of the rectifier through the lead 19.

Now in order to produce the current pulses in the discharge space 1 according to the invention, the following further arrangements are provided:

The switching contact 17 is actuated by a cam disc 21 via a rocking lever provided with a roller 20, the cam disc being set into rotation from an electric motor 22 having reduction gears 23, 24. When the roller 20 of the rocking lever is in the raised position, the control electrodes of the rectifier tubes 7, 8, 9 receive via the contacts 17 and 25 a higher negative bias potential than when the roller 20 is not raised, the control electrode being given a smaller negative potential, adjustable at the potentiometer, via contact elements 17 and 26. The cam disc 21 consists of two component discs which can be rotated with respect to each other and each of them has a cam-lifting projection with a peripheral length of 180° measured in a circular arc. Both component discs being rotatable with respect to each other, it is possible to adjust at will the time when the rocking lever 17, 20 is in the raised position. By this means it is possible to vary the ratio between pulse length and pulse interval, whilst the resistance 27 is able to influence the speed of the motor 22, so that the frequency of the pulse sequence is preadjustable.

Thus by using the means illustrated and described it is continuously possible to supply the gaseous discharge space with current pulses of the most diverse frequencies and with any ratio between pulse duration and pulse interval. Furthermore by means of the potentiometer 16 it is possible during the pulse intervals to reduce the current completely to the value 0, or to maintain an adjustable basic current level which is intensified by pulses.

The progress of the gaseous discharge may however be made discontinuous also by changing the treating gas or by adding other substances, especially gases, to it whilst changing the atmosphere available for treatment. In order to carry out these measures, an evacuating pump is provided at 28 and is driven by an electric motor 29. The evacuating pump is in communication with the space 1 through the conduit 30. By means of a shut-off device 31 the evacuating pump may be sealed off completely from the gaseous discharge space. In this case the needle valve 32, which is arranged in the by-pass to the shut off valve 31, can be adjusted to diminish the quantity of gas drawn off, so that any pressures can be set in the discharge space 1.

With the object of creating alternating atmospheres of any kind in the discharge space 1, the gas cylinder 33 is first provided, then the gas cylinder or cylinders 34. For example, it is possible to store hydrogen in the cylinder 33 and ammonia in the cylinder 34 so that in this way work-pieces may be subjected successively to reducing and nitriding.

Via the screening devices, reducing valves and pressure indicating devices 35, 36 arranged at each cylinder 33, 34, the latter are connected through the pipe leads 37, 38 to a changeover valve 39, of which the regulating cocks are driven from the electric motor 41 through the crank 40. The electric motor 41 is under the control of a regulating resistance 42, so that it is possible to adjust the speed of rotation, which is transmitted to the change-over valve 39 at a lower speed through the reducing gear 43.

In this way the frequency with which the treatment space 1 is supplied with the diversity of atmospheres per unit of time is varied within practical limits. The different treatment periods involved may be of an order of magnitude from minutes to hours. Connected to the change-over valve 39 is the common supply pipe 44 which passes through a needle valve 45 and at 46 discharges into the treatment space 1. The needle valve 45 is under the control of a cam disc 47 set into rotation from the electric motor 49 through a reducing gear 48. Again the electric motor 49 is under the influence of a regulating resistance 50, so that it is possible to vary at will the frequency of pressure variations which are imparted to the treatment gas via the rhythmically controlled needle valve. The motors 22, 41 and 49 are fed from the supply connections 51, 52, through the already mentioned control resistances 27, 42, 50 placed in circuit.

The drawing further illustrates the means adopted for producing the discontinuous variation in the condition of the object or work-piece.

The work-piece 53, illustrated as a simple cylinder, is mounted on the cathode or otherwise associated with it. Naturally the centre electrode need not take the form of the cathode. It may equally well be the anode, in which case the vessel walls will be connected up as the cathode.

The discontinuous state of the work-piece is ensured by providing a screening device at 54 in the form of a cap. The cap 54 is held at 55 by an arm which in turn is secured to the stand 56. The cap 54 is in metallic connection with the anode 2. Due to the fact that it surrounds the work-piece at a slight distance, the formation of a glow discharge, which is produced over the rest of the surface of the work-piece 53, is discontinued there. A second discontinuity in the work-piece is brought about by intensely cooling the cathode 5 which the work-piece partially encloses. For this purpose the cathode is arranged as a hollow cylinder which at its lower end is provided with branches for the coolant inlet pipe 57 and the coolant outlet pipe 58.

Due to the temperature drop brought about in the work-piece in this way, variations in the kind of action of the gaseous discharge on same occur, it being possible to effect this variation by the temperature of the coolant, by the quantity of delivered per unit of time, by the arrangement of the cooling and screening surfaces and by controlling this arrangement.

Finally, the drawing illustrates those devices which are necessary for automatically varying the determining magnitudes bringing about the discontinuous progress of the gaseous discharge, the regulation being brought about for example automatically in accordance with the temperature condition of the work-piece. For this purpose a temperature-sensitive device 59 in the form of a thermo-element is introduced into the interior of the work-piece 53.

The thermo-current generated is led over the conductors 60, 61 to the indicating instrument 62 and through the latter to the control relay 63. The control relay by short-circuiting the variable resistance 64, regulates the current which is delivered over the conductors 19, 18 to the discharge vessel. If for instance the temperature of the workpiece 53 falls below a certain value, the circuit of the relay 63 is so influenced through the parts 59, 62, that its contacts are closed. Owing to the by-passing of the regulating resistance 64 an increased supply of energy takes place and consequently a rise in the temperature of the work-piece. If a certain temperature condition of the work-piece is exceeded the contacts of the relay 63 are opened, over the same circuit. Hence the resistance 64 is interposed and consequently the power delivered to the discharge vessel is reduced. This action repeats itself periodically so that the temperature of the object fluctuates about a certain mean value within small adjustable limits.

In nitriding processes, for example of steel, in an ammonia atmosphere at a presusre of 6–15 mm. mercury column, it has been found that pulses with a duration of 0.1–0.2 second and an ionising voltage of 550 volts, followed by intervals of 0.4–1.4 seconds at an ionising voltage of 350 volts, thus resulting in pulses of specific loadings of between 2 and 20 watts/cm.$^2$, are able to form a nitrided layer of 0.4 to 0.5 mm. thickness on the steel objects treated in a total processing time of 15 hours, whereas with the usual gas nitriding processes it formerly required 40 to 60 hours to obtain the same result. The mean temperatures may at the same time be kept lower than when operating with the same ionisation voltage continuously. Other kinds of diffusion processes are similarly improved and a noteworthy increase in the rate of diffusion is ascertainable. Furthermore, by employing lower temperatures, the results obtained are qualitatively better, since changes in the material structure can be avoided. Similar effects can be found particularly in the diffusion of chromium in steel. Moreover, by an acceleration or intensification of diffusion processes satisfactory results have been obtained in the degasifying of metals, and in the separating out of impurities such as sulphur, phosphorus, etc. The action of the latter factors is not fully clear, since the diffusion in metals and the role played by various trace elements as well as the influences of temperature, etc. on the complicated physicochemical processes are not completely explicable by present day scientific knowledge.

It will be evident from the foregoing that the above-described process and apparatus are so operated that the article or body being treated is subjected to alternating periods $T_1$ and $T_2$ of selected duration to different ionization intensities $I_1$ and $I_2$, such that the equation $$I_1T_1+I_2T_2=I_m(T_1+T_2)$$

is satisfied, $I_m$ being the mean ionization intensity which, if applied continuously, would maintain the treated body at the temperature necessary for the type of treatment being applied. Where the voltage is the regulated variable, then the corresponding voltage values $U_1$, $U_2$ and $U_m$ replace the values $I_1$, $I_2$ and $I_m$, respectively, in the equation; whereas when the gas pressure is the variable factor, the pressure values $p_1$, $p_2$ and $p_m$ will replace the values $I_1$, $I_2$ and $I_m$, respectively, in the said equation.

The invention described herein relates to the same general type of apparatus as is disclosed in our copending applications, Serial Nos. 206,672, 206,673 and 206,675, all filed January 18, 1951 now U.S. Patent Nos. 2,701,-846; 2,762,945 and 2,787,730 respectively. The inventions described and claimed in such copending applications are, however, distinguished from that described and claimed herein in that, whereas the invention of the present application is directed to a process and apparatus for the treatment of materials and articles by an electrical glow discharge, wherein the intensity of the glow discharge is periodically altered in various ways, the inventions described and claimed in Serials Nos. 206,672 and 206,673 relate to the structure of the electrode and insulator assembly; while that described and claimed in Serial No. 206,675 relates to a process and apparatus for diminishing the effects of high-frequency oscillations in the glow discharge space.

What we claim, is:

1. In a process for the treatment of a metallic body by heating the same to a predetermined surface temperature in a gaseous atmosphere in a discharge chamber by means of an ionic bombardment at the surface thereof in an electric glow discharge, and wherein the said body is mounted in the discharge chamber and is insulated from a counter-electrode and is connected by way of an insulated current lead-in in the wall of the chamber with an at least periodically negative pole of a source of current; its other pole being connected to the counter-electrode, the steps which comprise applying to said current lead-in and said counter-electrode for maintaining the glow discharge, a voltage at a value $U_1$ and at a value $U_2$, the voltage $U_1$ being higher and the voltage $U_2$ being lower than the average voltage $U_m$ which at constant prevailing gas pressure is required for attaining the predetermined temperature at the surface of the treated body, operating the glow discharge on the body at the voltage $U_1$ during a first time interval $T_1$, reducing the voltage to the value $U_2$ and operating the glow discharge on the body at the voltage $U_2$ during a second time interval $T_2$, and repeating said cycle with the period $T_1+T_2$ by periodically switching from one voltage to the other, the voltage values $U_1$ and $U_2$ and the time intervals $T_1$ and $T_2$ being so chosen that the equation $$(U_1T_1+U_2T_2)=U_m(T_1+T_2)$$

is satisfied; whereby the surface of the body does not substantially exceed nor fall below the predetermined surface temperature.

2. In a process for the treatment of a metallic body by heating the same to a predetermined surface temperature in a gaseous atmosphere in a discharge chamber by means of an ionic bombardment at the surface thereof in an electric glow discharge, and wherein the said body is mounted in the discharge chamber and is insulated from a counter-electrode and is connected by way of an insulated current lead-in in the wall of the chamber with an at least periodically negative pole of a source of current being connected to the counter-electrode, the steps which comprise applying a substantially constant voltage to the current lead-in and counter-electrode, continuously withdrawing gas from the chamber and regulating the gas supply thereto to keep the pressure between a first pressure $p_1$ which is higher than, and a second pressure $p_2$ which is lower than, the average pressure $p_m$ which is required at the constant voltage for maintaining the said predetermined temperature at the surface of the body, operating the glow discharge chamber at the pressure $p_1$ during a first time interval $T_1$, lowering the pressure to the value $p_2$ and operating the glow discharge in the chamber during a second interval $T_2$, repeating the cycle with the period $T_1+T_2$, the values $p_1$ and $p_2$ being so adjusted and the time intervals $T_1$ and $T_2$ being so chosen that the equation $(p_1T_1+p_2T_2)=p_m(T_1+T_2)$ is satisfied, whereby the surface of the body does not substantially exceed nor fall below the predetermined temperature.

3. Process according to claim 1, wherein the time interval $T_1$ of higher glow discharge intensity is shorter than the time interval $T_2$ of lower glow discharge intensity, whereby simultaneously the difference in the glow discharge intensities in successive time intervals is increased.

4. Process according to claim 2, wherein the time interval $T_1$ of higher glow discharge intensity is shorter than the time interval $T_2$ of lower glow discharge intensity, whereby simultaneously the difference in the glow discharge intensities in successive time intervals is increased.

5. Process according to claim 1, wherein the time interval $T_1$ of higher glow discharge intensity is shorter than the time interval $T_2$ of lower glow discharge intensity, whereby simultaneously the difference in the glow discharge intensities in successive time intervals is increased, the duration of the time interval $T_1$ being in the range of 0.1 second to several seconds.

6. Process according to claim 2, wherein the time interval $T_1$ of higher glow discharge intensity is shorter than the time interval $T_2$ of lower glow discharge intensity, whereby simultaneously the difference in the glow discharge intensities in successive time intervals is increased, the duration of the time interval $T_1$ being of the order of magnitudes of minutes.

7. Process according to claim 1, wherein the voltage $U_2$ is so low that the glow discharge is extinguished during the time interval $T_2$.

8. Process according to claim 1, wherein the voltage $U_2$ has substantially the smallest value at which a glow discharge is still maintained in the chamber.

9. Process for nitriding steel articles which comprises connecting a steel article to an at least periodically negative pole of a source of current, connecting the other pole of the source of current to a counter-electrode and passing electric current between the article and the counter-electrode in an ammonia-containing atmosphere at a pressure of about 6 to 15 mm. Hg, the current being applied in alternation at about 550 volts for a period of 0.1 to 0.2 second and at a voltage of about 350 volts for a period of about 0.4 to 1.4 seconds until the desired depth of the nitrided layer is obtained.

10. Process according to claim 9, where the higher and lower voltages are applied in alternation for a total processing time of about 15 hours.

11. Apparatus for the treatment of a metallic body in a gaseous atmosphere wherein it is to be heated to a predetermined surface temperature by means of an ionic bombardment at the surface of the body in an electric glow discharge, comprising, in combination with a metallic discharge chamber having at least one electrically insulated current lead-in in the walls thereof and adapted to be connected conductively with the body to be treated, and a counter-electrode, said lead-in being insulated from said counter-electrode, of an external source of voltage having an at least periodically negative pole connected to the current lead-in, its other pole being connected to the counter-electrode, a gas suction connection leading from the interior of the discharge chamber, a gas supply connection leading into the interior of the chamber, means for regulating the intensity of the glow discharge in the chamber between a higher value which on continuous operation would raise the temperature of the treated body above the predetermined temperature, and a lower value which on continuous operation would impart to the treated body a temperature below the predetermined temperature, and a timer for controlling the regulating means to determine the length of the alternating intervals of higher and lower glow discharge intensity.

12. Apparatus for the treatment of a metallic body in a gaseous atmosphere wherein it is to be heated to a predetermined surface temperature by means of an ionic bombardment at the surface of the body in an electric glow discharge, comprising, in combination with a metallic discharge chamber having at least one electrically insulated current lead-in in the walls thereof and adapted to be connected conductively with the body to be treated, and a counter-electrode, said lead-in being insulated from said counter-electrode, of an external source of voltage having an at least periodically negative pole connected to the current lead-in, its other pole being connected to the counter-electrode, said external source of voltage providing a higher and a lower voltage, a switch mechanism in the circuit of said voltage source and operable to apply the higher and lower voltages in alternation to said lead-in and counter-electrode, an automatically operating timer for periodically reversing said switch mechanism to cause switching from the higher to the lower voltage, and vice versa, a gas suction connection leading from the interior of the discharge chamber, and a gas supply connection leading into the interior of the chamber.

13. Apparatus according to claim 12, wherein the source of voltage includes means for varying the magnitudes of the supplied voltages, and wherein the timer is adjustable to vary the lengths of the periods during which the respective voltages are applied.

14. Apparatus for the treatment of a metallic body in a gaseous atmosphere wherein it is to be heated to a predetermined surface temperature by means of an ionic bombardment at the surface of the body in an electric glow discharge, comprising, in combination with a metallic discharge chamber having at least one electrically insulated current lead-in in the walls thereof and adapted to be connected conductively with the body to be treated, and a counter-electrode, said lead-in being insulated from said counter-electrode, of an external source of voltage having an at least periodically negative pole connected to the current lead-in, its other pole being connected to the counter-electrode, a gas suction connection leading from the interior of the discharge chamber, a gas supply connection leading into the interior of the chamber, regulating mechanism for the gas supply connection operable to effect charging of two different quantities of gas into the chamber, and an automatically operating timer for periodically setting the regulating mechanism to cause feeding of the different quantities of gas in alternation.

15. Apparatus according to claim 14, wherein said timer is adjustable to vary the length of the intervals during which the gas is supplied.

16. Apparatus according to claim 11, including a temperature-sensitive member responsive to changes in the surface temperature of the treated body, the regulating means being connected with said temperature-sensitive member and the timer for determining the duration of the alternate intervals of the timer in dependence on the response of the temperature-sensitive member.

17. Apparatus according to claim 12, including a temperature-sensitive member responsive to changes in the surface temperature of the treated body, and a regulating means connected with said temperature-sensitive member and the timer for determining the duration of the alternate intervals of the timer in dependence on the response of the temperature-sensitive member.

18. Apparatus according to claim 14, including a temperature-sensitive member responsive to changes in the surface temperature of the treated body, a regulating mechanism being connected with said temperature-sensitive member and the timer for determining the duration of the alternate intervals of the timer in dependence on the response of the temperature-sensitive member.

References Cited in the file of this patent

UNITED STATES PATENTS

| | | |
|---|---|---|
| 1,905,993 | Buff | Apr. 25, 1933 |
| 2,031,214 | Fisher | Feb. 18, 1936 |
| 2,219,611 | Berghaus et al. | Oct. 29, 1940 |
| 2,219,614 | Berghaus et al. | Oct. 29, 1940 |
| 2,219,615 | Berghaus et al. | Oct. 29, 1940 |
| 2,342,784 | Berghaus et al. | Feb. 29, 1944 |
| 2,454,757 | Smith | Feb. 23, 1948 |
| 2,468,175 | Cotton | Apr. 26, 1949 |